(12) United States Patent
Jannasch et al.

(10) Patent No.: US 7,834,865 B2
(45) Date of Patent: Nov. 16, 2010

(54) ROTARY ACTUATOR

(75) Inventors: Hendrik Jannasch, Doncaster (GB); Thomas Kossakowski, Dortmund (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 953 days.

(21) Appl. No.: 11/703,387

(22) Filed: Feb. 7, 2007

(65) Prior Publication Data
US 2007/0159307 A1 Jul. 12, 2007

Related U.S. Application Data

(63) Continuation of application No. PCT/EP2005/010630, filed on Oct. 1, 2005.

(30) Foreign Application Priority Data
Oct. 5, 2004 (DE) .................. 10 2004 049 011

(51) Int. Cl.
| | |
|---|---|
| *F16H 21/00* | (2006.01) |
| *G05G 1/10* | (2006.01) |
| *H01H 19/14* | (2006.01) |
| *H04B 3/36* | (2006.01) |
| *H03K 17/94* | (2006.01) |
| *H03M 11/00* | (2006.01) |
| *G06F 3/033* | (2006.01) |
| *G09G 5/00* | (2006.01) |
| *H01H 47/00* | (2006.01) |

(52) U.S. Cl. .................. 345/184; 74/25; 74/553; 200/564; 340/407.1; 341/20; 361/139

(58) Field of Classification Search ............ 74/25, 74/471 XY, 553–556; 200/330, 331, 500, 200/501, 564, 565; 340/407.1; 341/20; 345/156–158, 345/61, 184; 351/139
See application file for complete search history.

(56) References Cited

U.S. PATENT DOCUMENTS

| | | | |
|---|---|---|---|
| 2,919,602 A | 1/1960 | Spraragen | |
| 6,067,077 A * | 5/2000 | Martin et al. | ............ 345/161 |

(Continued)

FOREIGN PATENT DOCUMENTS

| | | |
|---|---|---|
| DE | 197 12 049 A1 | 9/1998 |
| DE | 100 41 935 A1 | 3/2002 |
| DE | 103 41 740 A1 | 3/2005 |
| EP | 0 427 641 A1 | 5/1991 |
| EP | 1 220 068 A2 | 7/2002 |

*Primary Examiner*—Alexander S. Beck
(74) *Attorney, Agent, or Firm*—Brooks Kushman P.C.

(57) ABSTRACT

A rotary actuator includes a shaft with a knob which are rotatable about a shaft axis. The actuator includes a haptic effect device connected to the knob via the shaft. The haptic device is rotatable about the axis and includes a detent ring and a bolt fixed to the shaft. The haptic device and gearing engage one another such that haptic device is fixed in place unless the gearing is driven and the haptic device rotates when the gearing is driven. The bolt engages the detent ring to act as a mechanical catch for producing a haptic effect when the haptic device is fixed in place and the knob is manually rotated. The bolt engages the detent ring such that the haptic device together with the knob rotate when the gearing is being driven by a motor whereby the knob is rotated without manual intervention.

20 Claims, 2 Drawing Sheets

U.S. PATENT DOCUMENTS

| | | |
|---|---|---|
| 6,480,752 B1 | 11/2002 | Blume et al. |
| 6,591,175 B2 | 7/2003 | Numata et al. |
| 6,613,997 B2 | 9/2003 | Oster et al. |
| 7,507,158 B2 * | 3/2009 | Murzanski et al. ............ 463/38 |
| 2002/0128753 A1 | 9/2002 | Numata et al. |
| 2002/0148715 A1 * | 10/2002 | Oster et al. ................. 200/564 |

* cited by examiner

ROTARY ACTUATOR

CROSS-REFERENCE TO RELATED APPLICATIONS

This is a continuation of International Application PCT/EP2005/010630, published in German, with an international filing date of Oct. 1, 2005, which claims priority to DE 10 2004 049 011.2, filed Oct. 4, 2004, the disclosures of which are both hereby incorporated by reference.

BACKGROUND OF THE INVENTION

1. Field of the Invention

The present invention relates to a rotary actuator having a rotatably supported shaft with a rotary knob connected thereto and a device for producing a haptic effect when the rotary knob is rotated in which the device includes a detent ring and a lock bolt which engages the detent ring.

2. Background Art

Rotary actuators are used as data input devices. For example, rotating a rotary actuator and optionally pressing or swiveling the actuator allows a cursor to be controlled. A rotary actuator may be part of a joystick.

DE 197 12 049 A1 (corresponding to U.S. Pat. No. 6,480,752) describes a rotary actuator. In this rotary actuator, a haptic effect producing device has a geared connection to a shaft. Under appropriate loading, a motor exerts a torque on the shaft in the direction opposite to the rotary motion. Different haptic effects can be produced as a function of motor control as well as the rotational angle position of the shaft. In contrast to a rotary actuator having a haptic effect producing device designed as a mechanical catch, the neutral position of this actuator is relatively "soft". As a result of the necessary application of counter-torque by the motor an adjustment vibration can be felt when the handle is rotated.

DE 100 41 935 A1 (corresponding to U.S. Pat. No. 6,613,997) describes a rotary actuator which includes multiple annularly disposed detent rings on top of one another. The detent rings can be selectively activated by electromagnetically actuatable clamping rings for producing various haptic effects. This device eliminates the spongy feel of the haptic effect produced by a motor.

SUMMARY OF THE INVENTION

An object of the present invention is a rotary actuator in which the rotary actuator has the pronounced haptic effect of a mechanical catch device and allows the rotary knob to move without the rotary knob being manually actuated.

In carrying out the above object and other objects, the present invention provides a rotary actuator which includes a knob, a shaft, a detent ring, a bolt, a gear assembly, and a motor. The shaft is rotatable about an axis and is connected to the knob such that the knob and the shaft rotate with one another about the shaft axis. The detent ring has a plurality of detents, concentrically surrounds the shaft, and is rotatable about the shaft axis. The bolt is spring-loaded and is fixed to the shaft. The gear assembly engages the detent ring. The gear assembly is fixed in place unless driven such that the detent ring is fixed in place unless the gear assembly is driven. The detent ring rotates about the shaft axis upon the gear assembly being driven.

The bolt engages the detents of the detent ring one at a time to act as a mechanical catch for producing a haptic effect when the detent ring is fixed in place and the knob is manually rotated by an operator such that the knob, the shaft, and the bolt rotate relative to the detent ring about the shaft axis.

The bolt engages one of the detents of the detent ring when the gear assembly is being driven by the motor such that the detent ring, the bolt, the shaft, and the knob rotate together about the shaft axis whereby the knob is rotated without manual intervention.

Further, in carrying out the above object and other objects, the present invention provides a rotary actuator which includes a knob, a shaft, a haptic effect device, and a gear assembly. The shaft is rotatable about an axis and is connected to the knob such that the knob and the shaft rotate with one another about the shaft axis. The haptic effect device is connected to the knob via the shaft. The haptic effect device is rotatable about the shaft axis. The haptic effect device includes a detent ring and a bolt. The bolt is fixed to the shaft. The haptic effect device and the gear assembly are engaged to one another such that haptic effect device is fixed in place unless the gear assembly is driven and the haptic effect device rotates about the shaft axis when the gear assembly is driven.

The bolt engages the detent ring to act as a mechanical catch for producing a haptic effect when the haptic effect device is fixed in place and the knob together with the shaft are manually rotated about the shaft axis relative to the haptic effect device.

The bolt engages the detent ring such that the haptic effect device together with the knob and the shaft rotate about the shaft axis when the gear assembly is being driven by a motor whereby the knob is rotated without manual intervention.

In an embodiment of the present invention, a rotary actuator includes a haptic effect production device. The haptic effect production device is associated with an actuating device such as a gearing assembly or transmission gearing. An electric motor engages the actuating device for driving the actuating device. The haptic effect production device engages the actuating device such that the haptic effect production device together with a rotary knob connected thereto by a shaft rotate in response to the motor driving the actuating device.

A rotary actuator in accordance with an embodiment of the present invention proceeds from a rotary actuator whose haptic effect production device has the design of a mechanical catch, thereby providing a precise, predetermined haptic effect when the shaft and rotary knob are rotated. In this case, however, at the same time the haptic effect production device is rotatably supported in a housing of the rotary actuator and by a motor can rotate about the rotational axis of the shaft without manual intervention.

In an embodiment of the present invention, the haptic effect production device includes a detent ring situated on the inner side of an annular element. The annular element concentrically surrounds the shaft. The annular element has a circumferential outer gearing on its exterior by which it engages with the motor via the actuating device.

In an embodiment of the present invention, an angle measuring device is present in the housing of the rotary actuator. The angle measuring device is able to determine the exact rotational position of the shaft of the rotary actuator.

The above features, and other features and advantages of the present invention are readily apparent from the following detailed descriptions thereof when taken in connection with the accompanying drawings.

BRIEF DESCRIPTION OF THE DRAWINGS

A rotary actuator in accordance with an embodiment of the present invention is shown in the drawings in which.

DETAILED DESCRIPTION OF THE PREFERRED EMBODIMENT(S)

Figure 1:
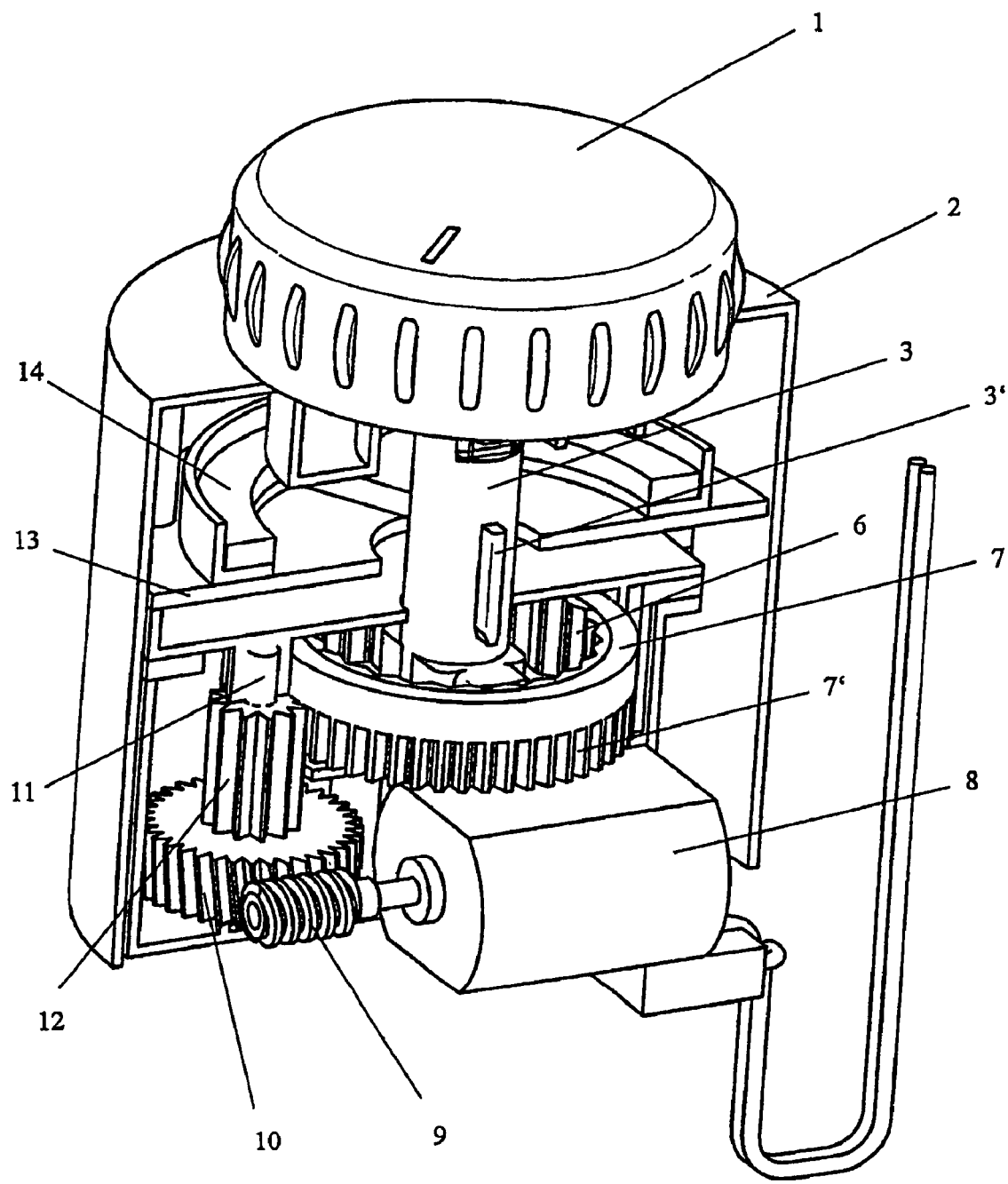
FIG. 1 illustrates a perspective cut-away view of the rotary actuator.
Figure 2:
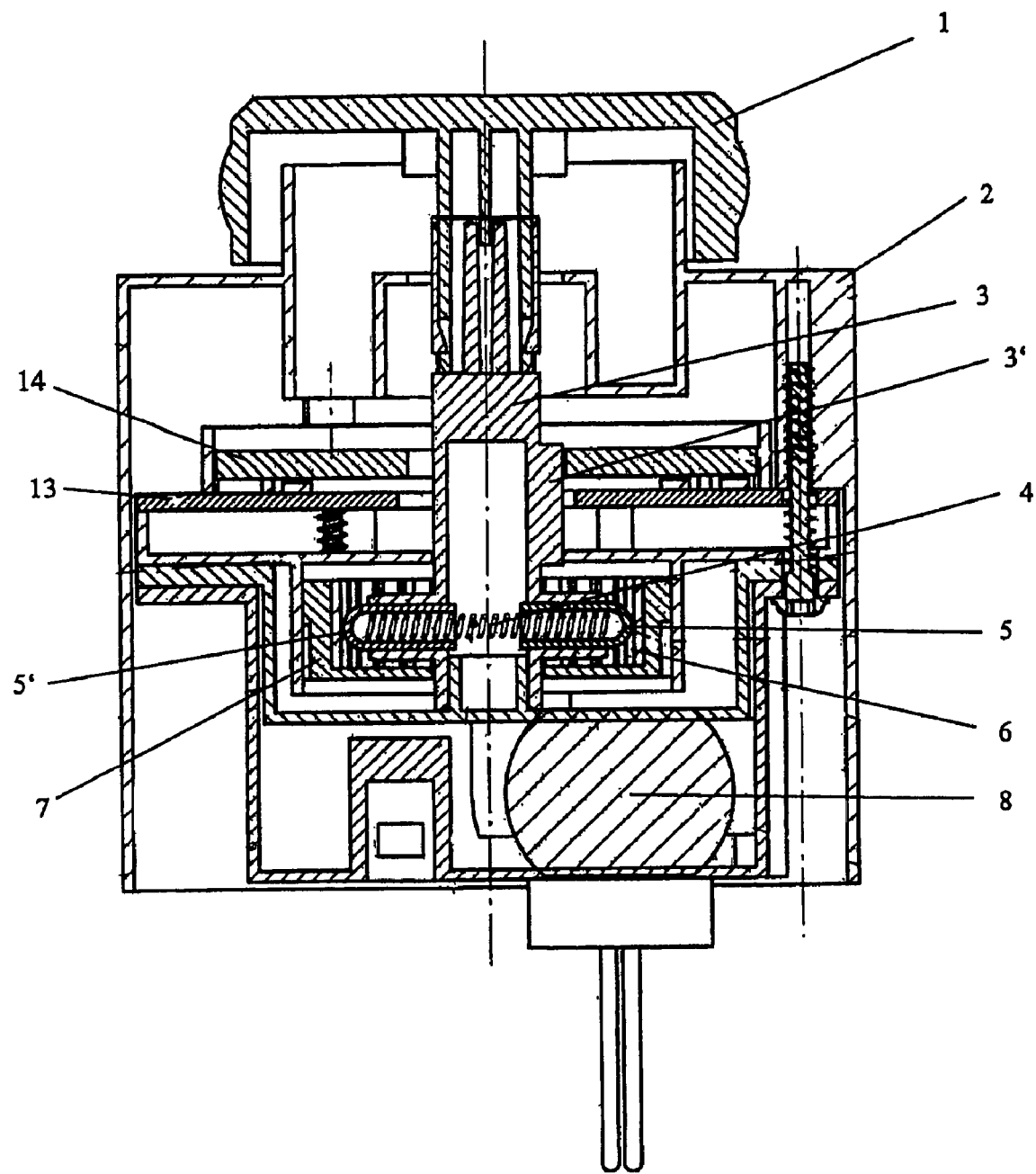
FIG. 2 illustrates a cross-sectional view of the rotary actuator.

Referring now to FIGS. 1 and 2, a rotary actuator in accordance with an embodiment of the present invention is shown. The rotary actuator includes a rotary knob 1 and an adjusting shaft 3. Shaft 3 is rotatably supported in a housing 2. Rotary knob 1 is located external to the upper side of housing 2 to provide access for manual operation of the rotary actuator. One end of shaft 3 passes through the upper side of housing 2 and connects with rotary knob 1. As such, rotary knob 1 and shaft 3 are rotatable together. The other end of shaft 3 is connected to a haptic effect production device inside of housing 2. As such, rotary knob 1 is connected to the haptic effect production device via shaft 2.

The haptic effect production device generally has the design of a mechanical catch device which includes a plurality of mechanical catches. To this end, the haptic effect production device includes a detent ring 6 situated on the inner side of an annular element 7 and includes a pair of spring-loaded lock bolts 5, 5'. Detent ring 6 includes a plurality of detents which run around the surface of detent ring 6. Each detent of detent ring 6 acts as a mechanical catch for catching one of bolts 5, 5' at a time.

Annular element 7 concentrically surrounds shaft 3. Annular element 7 is rotatably supported in housing 2 about an axis which coincides with the rotational axis of shaft 3. Bolts 5, 5' respectively engage in a pair of oppositely facing detents of detent ring 6 in a spring-loaded manner. Each pair of oppositely facing detents of detent ring 6 act as a mechanical catch. As such, detent ring 6 includes a plurality of catches. Bolts 5, 5' are oppositely situated in a sleeve-like receptacle. The sleeve-like receptacle is fixedly connected to shaft 3 and is oriented perpendicular to the rotational axis of shaft 3. Bolts 5, 5' are mutually supported by a pressure spring 4 inside the sleeve-like receptacle.

In addition to detent ring 6 on its interior surface, annular element 7 includes a circumferential outer gearing 7' on its exterior surface. Via gearing 7', annular element 7 and thus the entire haptic effect production device is engaged by a gearing connection (i.e., an actuating device) to an electric motor 8.

Motor 8 is situated within the lower portion of housing 2. The axle of motor 8 includes a worm gear 9. Worm gear 9 engages in a helical cylinder gear 10. Helical gear 10 is rotatably supported about an axis 11 that is parallel to the rotational axis of annular element 7. Helical gear 10 is fixedly connected to a spur-toothed cylinder gear 12. Cylinder gear 12 is rotatable about axis 11. Cylinder gear 12 is situated on the upper surface of helical gear 10. Cylinder gear 12 has a smaller diameter than helical gear 10. Cylinder gear 12 engages with outer gearing 7' of annular element 7. Outer gearing 7' of annular element 7 is likewise spur-toothed.

In this manner, motor 8 and annular element 7 both engage a gearing connection such that annular element 7 and thus detent ring 6 rotate upon motor 8 driving the gearing connection.

Self-locking of the gearing connection blocks rotation of annular element 7 when motor 8 is stopped. As a result, annular element 7 and thus detent ring 6 are fixed in position whereas rotary knob 1 and shaft 3 are still rotatable. A user can manually rotate rotary knob 1 into another position as long as the user supplies a sufficient force. That is, rotary knob 1 can be manually rotated as long as the manual rotation force is greater than the detent force generated between the cooperation of bolts 5, 5' and detent ring 6 of the haptic effect production device between adjoining catch positions.

Likewise, motor 8 can be operated to rotate rotary knob 1 into another position without manual intervention. A rotation of the axle of motor 8 is converted to a rotation of annular element 7 via the gearing connection. Because the force acting between bolts 5, 5' and detent ring 6 is considerably greater than other forces acting on shaft 3, which are essentially muted by the bearing friction, rotary knob 1 is also adjusted via the haptic effect production device which is entrained in the motion.

If rotary knob 1 is blocked during a motorized adjustment of shaft 3 such as by being held by the user, then the mechanical catch between detent ring 6 and bolts 5, 5' acts in the manner of a slide coupling. Via motor 8, annular element 7 together with detent ring 6 then rotates further with respect to the held shaft 3 and bolts 5, 5' connected to shaft 3 thus at the same time providing protection from unintentional damage to the system. In order to restrict possible rotation of rotary knob 1 to a fixed angular range, shaft 3 includes in a region of its circumference a stop cam 3'. Stop cam 3' in the respective end position of the specified range of the rotational angle comes to rest against corresponding counterstops in housing 2.

A printed circuit board 13 is located within housing 2. Circuit board 13 is situated above the haptic effect production device and at least partially surrounds shaft 3. Circuit board 13 includes an electronic controller. The electronic controller controls operation of the rotary actuator including operation of motor 8. Circuit board 13 further includes a plurality of stationary scanning elements of an angle measuring device. The angle measuring device uses the scanning elements to determine the rotational position of shaft 3. The scanning elements cooperate with corresponding initiator elements 14 fixedly connected to shaft 3. Initiator elements 14 rotate with shaft 3 relative to circuit board 13 which is stationary. As such, initiator elements 14 rotate relative to the scanning elements as shaft 3 rotates. In this manner, the angle measuring device is able to determine the rotational position of shaft 3 and, thus, the rotational position of rotary knob 1. The scanning elements and initiator elements 14 associated therewith may be photoelectric barriers, for example, which cooperate with screening or reflecting elements, or Hall effect sensors or magneto-resistant sensors which cooperate with correspondingly designed magnet structures.

The angle measuring device is used to determine the exact angular position of rotary knob 1. Knowledge of the angular position of rotary knob 1 may be used for evaluating a rotary motion caused by manual adjustment of rotary knob 1 to enable initiation of the switching process connected thereto. Further, knowledge of the angular position of rotary knob 1 may be used for achieving a desired target position when rotary knob 1 is adjusted by motor 8.

LIST OF REFERENCE NUMERALS

1 Rotary knob
2 Housing
3 Adjusting shaft
3' Stop element
4 Pressure spring
5, 5' Lock bolts
6 Detent ring
7 Annular element
7' Outer gearing
8 Electric motor 9 Worm gear
10 Helical cylinder gear
11 Axis
12 Spur-toothed cylinder gear
13 Printed circuit board
14 Initiator elements While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A rotary actuator comprising:
a knob;
a shaft rotatable about an axis, wherein the shaft and the knob are connected such that the knob is rotatable with the shaft about the shaft axis;
a detent ring having a plurality of detents, the detent ring concentrically surrounds the shaft and is rotatable about the shaft axis;
a spring-loaded bolt fixed to the shaft;
a gear assembly engaging the detent ring, wherein the gear assembly is fixed in place unless driven such that the detent ring is fixed in place unless the gear assembly is driven, wherein the detent ring rotates about the shaft axis upon the gear assembly being driven; and
a motor for driving the gear assembly;
wherein, when the detent ring is fixed in place and the knob is being manually rotated about the shaft axis by an operator, the knob, the shaft, and the bolt together rotate relative to the detent ring about the shaft axis and the bolt engages the detents of the detent ring one at a time to act as a mechanical catch for producing a haptic effect;
wherein, when the motor is driving the gear assembly such that the detent ring is being rotated about the shaft axis, the bolt engages one of the detents of the detent ring such that the bolt, the shaft, and the knob together with the detent ring rotate about the shaft axis whereby the knob is rotated about the shaft axis without an operator manually rotating the knob;
wherein, when the motor is driving the gear assembly such that the detent ring is being rotated about the shaft axis and the knob is being manually held in place by an operator, the knob and the shaft together with the bolt are held in place and the bolt engages the detents of the detent ring one at a time to act as a mechanical catch for producing a haptic effect as the detent ring rotates about the shaft axis.

2. The rotary actuator of claim 1 further comprising:
an annular element having inner and outer surfaces, the annular element concentrically surrounding the shaft and is rotatable about the shaft axis;
wherein the detent ring is on the inner surface of the annular element;
wherein the gear assembly engages the outer surface of the annular element to engage the detent ring.

3. The rotary actuator of claim 2 wherein:
the outer surface of the annular element includes a circumferential outer gearing, wherein the gear assembly engages the outer gearing of the outer surface of the annular element to engage the detent ring.

4. The rotary actuator of claim 1 wherein:
the shaft includes a stop cam which in an angular rotation position of the shaft about the shaft axis rests against a corresponding counter-stop in a housing of the rotary actuator.

5. The rotary actuator of claim 1 further comprising:
a circuit board having an electronic controller for controlling operation of the motor, wherein the circuit board at least partially surrounds a portion of the shaft along the shaft axis.

6. The rotary actuator of claim 5 wherein:
the circuit board further includes an angle measuring device for determining the angular rotational position of the shaft about the shaft axis.

7. The rotary actuator of claim 6 wherein:
the angle measuring device includes scanning elements and initiator elements which are fixedly connected to the shaft to rotate with the shaft about the shaft axis relative to the scanning elements.

8. The rotary actuator of claim 1 wherein:
the shaft includes a sleeve-like receptacle fixed to the shaft, wherein the bolt is contained in the sleeve-like receptacle.

9. The rotary actuator of claim 1 further comprising:
a second spring-loaded bolt fixed to the shaft, wherein the bolts are oppositely situated from one another.

10. The rotary actuator of claim 1 further comprising:
a housing;
wherein the housing contains the shaft, the detent ring, the bolt, the gear assembly, and the motor;
wherein the knob is located outside of the housing for manual access by the operator.

11. A rotary actuator comprising:
a knob;
a shaft rotatable about an axis, wherein the shaft and the knob are connected such that the knob is rotatable with the shaft rotate about the shaft axis;
a haptic effect device connected to the knob via the shaft, the haptic effect device being rotatable about the shaft axis, the haptic effect device including a detent ring and a bolt, wherein the bolt is fixed to the shaft;
a gear assembly; and
a motor for driving the gear assembly;
wherein the haptic effect device and the gear assembly are engaged to one another such that detent ring is fixed in place unless the gear assembly is driven and the detent ring rotates about the shaft axis when the gear assembly is driven;
wherein, when the detent ring is fixed in place and the knob is being manually rotated about the shaft axis by an operator, the knob, the shaft, and the bolt together rotate relative to the detent ring about the shaft axis and the bolt engages the detent ring to act as a mechanical catch for producing a haptic effect;
wherein, when the motor is driving the gear assembly such that the detent ring is being rotated about the shaft axis, the bolt engages the detent ring such that the bolt, the knob, and the shaft together with the detent ring rotate about the shaft axis whereby the knob is rotated about the shaft axis without an operator manually rotating the knob;

wherein, when the motor is driving the gear assembly such that the detent ring is being rotated about the shaft axis and the knob is being manually held in place by an operator, the knob and the shaft together with the bolt are held in place and the bolt engages the detent ring to act as a mechanical catch for producing a haptic effect as the detent ring rotates about the shaft axis.

12. The rotary actuator of claim 11 wherein:
the haptic effect device includes an annular element having inner and outer surfaces, the annular element concentrically surrounding the shaft and is rotatable about the shaft axis, wherein the detent ring is on the inner surface of the annular element, wherein the gear assembly engages the outer surface of the annular element to engage the haptic effect device.

13. The rotary actuator of claim 12 wherein:
the outer surface of the annular element includes a circumferential outer gearing, wherein the gear assembly engages the outer gearing of the outer surface of the annular element to engage the haptic effect device.

14. The rotary actuator of claim 11 wherein:
the shaft includes a stop cam which in an angular rotation position of the shaft about the shaft axis rests against a corresponding counter-stop in a housing of the rotary actuator.

15. The rotary actuator of claim 11 further comprising:
a circuit board having an electronic controller for controlling operation of the motor, wherein the circuit board at least partially surrounds a portion of the shaft along the shaft axis.

16. The rotary actuator of claim 15 wherein:
the circuit board further includes an angle measuring device for determining the angular rotational position of the shaft about the shaft axis.

17. The rotary actuator of claim 16 wherein:
the angle measuring device includes scanning elements and initiator elements which are fixedly connected to the shaft to rotate with the shaft about the shaft axis relative to the scanning elements.

18. The rotary actuator of claim 11 wherein:
the shaft includes a sleeve-like receptacle fixed to the shaft, wherein the bolt is contained in the sleeve-like receptacle.

19. The rotary actuator of claim 11 wherein:
the haptic effect device further includes a second bolt fixed to the shaft, wherein the bolts are oppositely situated from one another.

20. The rotary actuator of claim 11 wherein:
the bolt is spring-loaded.

* * * * *